(12) United States Patent
Steinich

(10) Patent No.: US 6,185,155 B1
(45) Date of Patent: Feb. 6, 2001

(54) SUPPORT FOR A WAVEGUIDE FOR CONDUCTING MECHANICAL WAVES AND METHOD FOR PRODUCING A SUPPORT FOR A WAVEGUIDE

(75) Inventor: Klaus-Manfred Steinich, Poering (DE)

(73) Assignee: ASM Automation Sensorik Messtechnik GmbH, Unterhaching (DE)

( * ) Notice: Under 35 U.S.C. 154(b), the term of this patent shall be extended for 0 days.

(21) Appl. No.: 09/204,574

(22) Filed: Dec. 3, 1998

(30) Foreign Application Priority Data

Dec. 3, 1997 (DE) .............................. 197 53 805

(51) Int. Cl.⁷ .................................................. H04R 15/00
(52) U.S. Cl. ............................................................. 367/140
(58) Field of Search ....................... 367/140; 324/207.13; 333/148

(56) References Cited

U.S. PATENT DOCUMENTS 3,965,448 * 6/1976 Browning .............................. 333/248
5,590,091 * 12/1996 Gloden et al. ................... 324/207.13

FOREIGN PATENT DOCUMENTS

| 2 015 698 | 8/1972 | (DE) . |
| 25 41 243 | 3/1977 | (DE) . |
| 28 30 611 | 1/1980 | (DE) . |
| 28 47 871 | 1/1980 | (DE) . |
| 0 057 506 A1 | 8/1982 | (EP) . |
| 2 153 184 | 8/1985 | (GB) . |

OTHER PUBLICATIONS

International Application WO 88/09917 (Lukosz), dated Dec. 15, 1988.

* cited by examiner

Primary Examiner—Daniel T. Pihulic
(74) Attorney, Agent, or Firm—Herbert L. Lerner; Laurence A. Greenberg; Werner H. Stemer

(57) ABSTRACT

A support for a waveguide for conducting mechanical waves has a high proportion of gas and a low proportion of solid material. The support may include a plurality of annular flanges spaced along the waveguide for supporting the waveguide at small contact surface areas. The support may include open-cell or closed cell material.

23 Claims, 13 Drawing Sheets

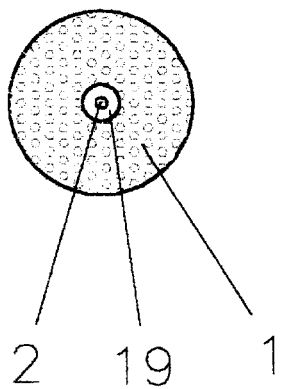
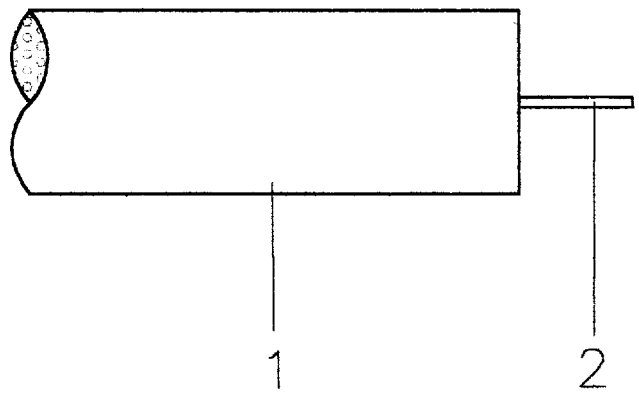
FIG. 1A　　　　　FIG. 1B
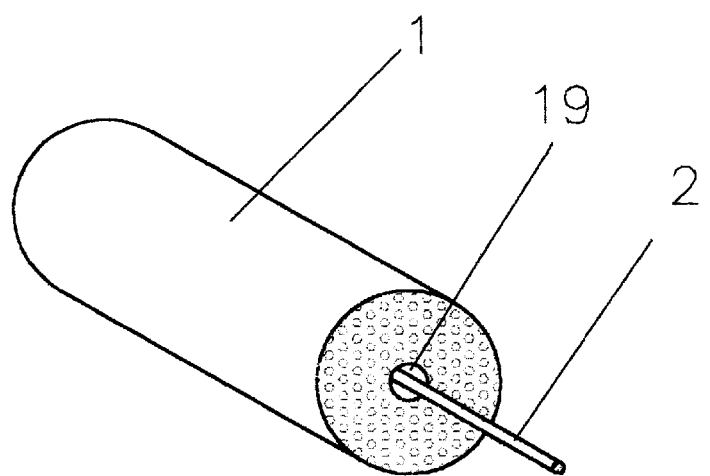
FIG. 1C

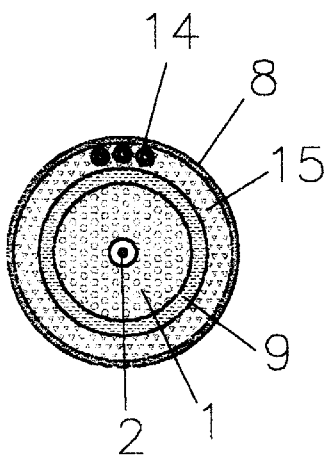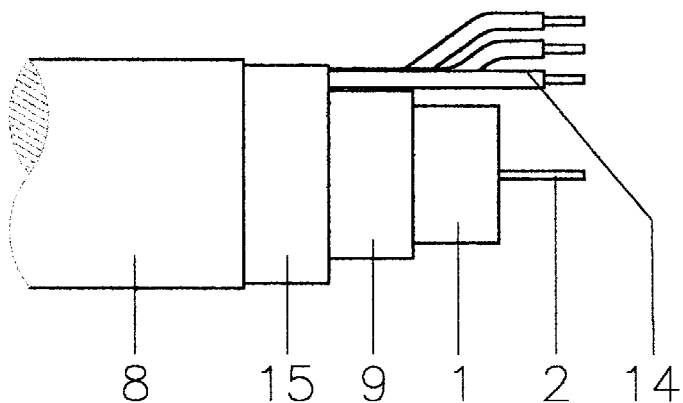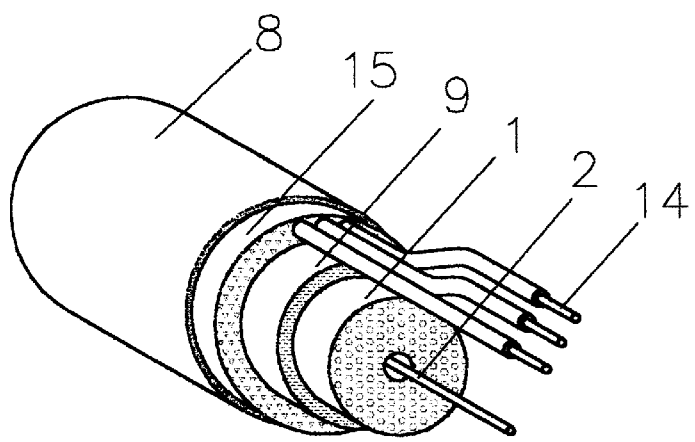

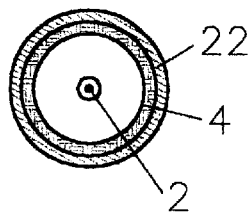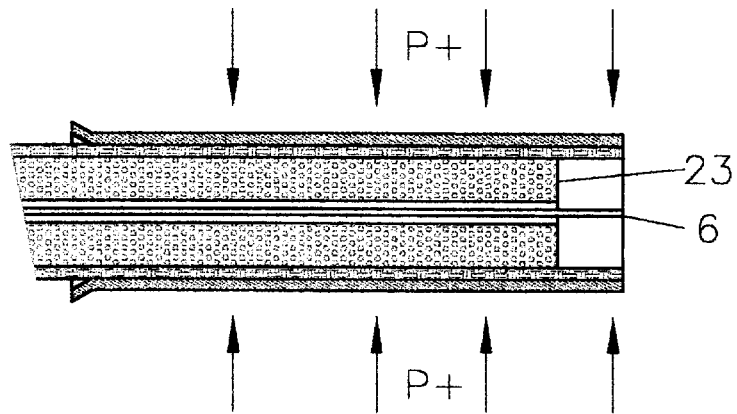
FIG. 13A
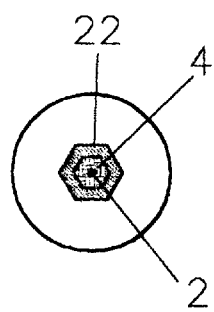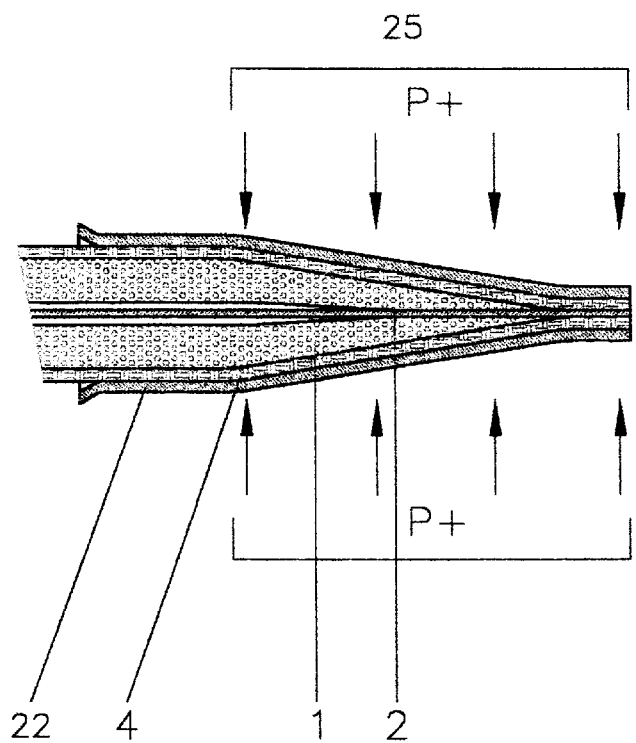
FIG. 13B

SUPPORT FOR A WAVEGUIDE FOR CONDUCTING MECHANICAL WAVES AND METHOD FOR PRODUCING A SUPPORT FOR A WAVEGUIDE

BACKGROUND OF THE INVENTION

Field of the Invention

The invention concerns a support for waveguides, which conduct mechanical waves. More particularly, the invention concerns a support for use in position sensors operating on the basis of the principle of the transit time of mechanical waves. The invention also concerns a method for producing such a support.

Position sensors operating in accordance with the principle of transit time measurements of mechanical waves in a metal waveguide generally have an elongate body of non-magnetic or plastic material constituting a housing for accommodating and supporting the mechanical waveguide. As a rule, a waveguide for conducting mechanical waves is made of a thin-walled tube, a wire or a strip. The waveguide may also serve as an electrical conductor.

Based on the Wiedemann effect, an exciter current pulse is fed into a waveguide and is superimposed with an external magnetic field. The external magnetic field is directed to the waveguide, in particular in a lateral direction. The current pulse thus produces a longitudinal or torsional pulse. The torsional and/or longitudinal pulse produced by the superimposition of the two magnetic fields is propagated approximately at a speed of about 2,500 to 6,000 m/s from the location at which it originates in both directions along the waveguide.

A detector detects the wave pulse at a reference position, which is usually at one end of the waveguide. The time period between the triggering of the exciter current pulse and the reception of the wave pulse after a transit thereof along the waveguide measures the distance of a displaceable positioning magnet from the detector.

A typical measuring arrangement which is based on the principle of transit time of mechanical waves is disclosed in U.S. Pat. No. 3,898,555.

The waveguide may be supported within the housing and is thus protected from the effects of external mechanical disturbances. Mechanical disturbances such as structure-borne noise, shock, or vibration may result in interference or noise signals in the position sensor arrangement. Those interference or noise signals are superimposed with the useful signal and cannot be distinguished therefrom. This results in incorrect measurements and the position measuring system cannot operate reliably.

In a number of position measuring systems the waveguide is supported by individual, spaced-apart support elements. The support elements are usually made from plastic material and have the shape of disks or conical elements. Such support elements are however expensive to produce and have to be fitted onto the waveguide by a threading procedure, which is a complicated and time-consuming operation.

Support elements of that kind are disclosed in the German patent document DE 33 43 310. A magnetostrictive tube is supported at suitable spacings by means of support rings. These support rings have a relatively narrow central opening through which the tube passes with only a small clearance. The support rings also define annular shoulders supporting portions of a protective tube surrounding the magnetostrictive tube.

A similar support configuration is described in the above-mentioned U.S. Pat. No. 3,898,555. The support has a plurality of rings arranged along the waveguide. Due to the particular design of this support configuration, it is difficult to handle the support elements.

An ideal support arrangement optimally protects the waveguide from external disturbances while damping or attenuating the torsional or longitudinal pulses, which are weak anyway, as little as possible.

A support arrangement having a woven, braided or plaited assembly with glass fibers, metal fibers, or polymer fibers and which is coated with a silicone rubber enclosure is disclosed in PCT-WO 96/35923. The waveguide is pulled into a hollow, double-layered cylindrical structure. The cylindrical structure prevents a lateral movement of the waveguide and protects the waveguide from the effects of vibration or external disturbances. The support configuration does not constrict the waveguide to such an extent that the mechanical waves, which are weak in any case, are damped or attenuated.

The above-described arrangement is highly temperature resistant and, compared to prior arrangements, reduces production costs for the manufacture and assembly of the waveguide support. Nonetheless, it suffers from a number of serious disadvantages, which have an adverse effect on the performance of the position measuring system with which it is used.

Due to the relatively high density of the material which makes up the woven or plaited glass fiber structure and the silicone rubber disposed thereon, vibrations and oscillations, caused by external excitation effects, may be transmitted to the waveguide, which can result in an interference. That effect is even further intensified by the high density of the external silicone layer.

A further disadvantage of this arrangement is that the tubular woven or plaited structure can be easily stretched, deformed, or upset, thereby changing the geometrical dimensions thereof and in particular changing its diameter. It is therefore not possible to guide and support the waveguide uniformly within the support arrangement, which however is an important requirement. The relatively hard material of the glass fibers of the inner layer can, in the event of external vibrations or oscillations, knock against the waveguide and cause interference signals.

The tubular support structure designed in the above-described manner has only little dimensional stability, due to the flexible material from which it is made. The woven or plaited assembly described in the above-mentioned document has a tubular woven or plaited material with a silicone coating thereon and is therefore highly flexible and not suited for mechanically supporting a waveguide.

SUMMARY OF THE INVENTION

It is accordingly an object of the invention to provide a support for a waveguide for conducting mechanical waves, which overcomes the above-mentioned disadvantages of the heretofore-known waveguide supports of this general type and which can protect the waveguide from external vibration or other external disturbances or interference phenomena and which minimizes damping and attenuation of torsional or longitudinal pulses propagated along the waveguide.

Another object of the invention is to provide a support for a waveguide for propagating mechanical waves, which provides an improved waveguide-supporting effect while also providing a substantially lower degree of damping or attenuation of the mechanical waves propagated on the waveguide.

Still a further object of the invention is to provide a support for a waveguide for conducting mechanical waves, which has a simple and easily reproducible structure so as to provide uniform properties of the structures.

Yet a further object of the invention is to provide a method for producing a support for a waveguide for conducting mechanical waves, which is simple to carry out while affording reliable results.

With the foregoing and other objects in view there is provided, in accordance with the invention, a support for a waveguide for conducting mechanical waves, comprising a support body formed of a high proportion of gas and a low proportion of solid material.

In accordance with a further feature of the invention, the support body has a plurality of web portions disposed at spacings along a waveguide for supporting the waveguide.

In accordance with another feature of the invention, the web portions have a smallest possible contact area with the waveguide and are disposed at largest possible mutual spacings for supporting the waveguide.

In accordance with yet another feature of the invention, the support body has a lowest possible density.

In accordance with a further feature of the invention, the support body has a cell-form structure.

In accordance with yet a further feature of the invention, the support body is self-supporting.

In accordance with another feature of the invention, the support body is made from a plastic material.

In accordance with a yet another feature of the invention, the support body has an open-pore or a closed pore cell-form structure.

In accordance with a further feature of the invention, the support body encloses a waveguide at least over a part of a periphery of the waveguide.

In accordance with another feature of the invention, the support includes an electrical return conductor for a position sensor operating on the basis of the principle of transit time of mechanical waves, the electrical return conductor disposed coaxially around a waveguide and the support body disposed between the waveguide and the electrical return conductor.

In accordance with a further feature of the invention, the support body is disposed between the waveguide and the return conductor along the entire length of the waveguide.

In accordance with yet another feature of the invention, the support includes a wire-shaped electrical return conductor of a position sensor, the wire-shaped return conductor being embedded into the support body.

In accordance with a further feature of the invention, the support includes a form-stabilizer for reinforcing the support body.

In accordance with a further feature of the invention, the form-stabilizing means for reinforcing the support body include fibers.

In accordance with a further feature of the invention, the support body has an end region at a free end of a waveguide and has a central region, the end region having a higher damping effect on mechanical waves propagated along the waveguide than the central region for damping an undesired reflection of the mechanical waves at the free end of the waveguide.

In accordance with a further feature of the invention, the support body has an end region at a free end of a waveguide and has a central region, the end region having a denser cell-form structure than the central region for damping an undesired reflection of mechanical waves at the free end of the waveguide.

In accordance with another feature of the invention, the support includes a protection device for protecting a free end of a waveguide from environmental influences.

In accordance with yet a further feature of the invention, the support includes an electrical return conductor of a position sensor operating on the basis of the principle of a transit time of mechanical waves, the return conductor disposed coaxially around a waveguide, the support body disposed between the waveguide and the electrical return conductor, the electrical return conductor and the waveguide connected at respective end regions thereof and protected form environmental influences.

In accordance with another feature of the invention, the support body has a plurality of web portions spaced along a waveguide for supporting the waveguide within the support body, the plurality of web portions formed of a non-cell-form structure.

In accordance with a further feature of the invention, the support body has a proportion of at least 50% by volume of gas and at most 50% by volume of solid material.

With the foregoing and other objects in view there is also provided, in accordance with the invention, a method for producing a waveguide configuration having a waveguide surrounded by a support body, which comprises providing an auxiliary core; producing a support body on the auxiliary core; connecting the auxiliary core to a waveguide; and drawing the waveguide into the support body by withdrawing the auxiliary core from the support body in an axial direction thereof.

With the foregoing and other objects in view there is also provided, in accordance with the invention, a method for supporting a waveguide, which comprises providing a coaxial cable having a conductor as an auxiliary core, a dielectric, a shielding, and a sheath; replacing the conductor with a waveguide by withdrawing the conductor from the coaxial cable and drawing the waveguide into the coaxial cable in an axial direction thereof.

With the foregoing and other objects in view there is furthermore provided, in accordance with the invention, a waveguide configuration, comprising an elongate waveguide for conducting mechanical waves; and a support body supporting the elongate waveguide by at least partially encircling the elongate waveguide over at least a part of a length thereof, the support body having a proportion of gas and a proportion of solid material, the proportion of gas being greater than the proportion of solid material.

It has been found that a waveguide support having a structure with a high proportion of gas, in particular air or propellent gas, such as nitrogen, and a low proportion of solid material, has substantially improved support properties, and in particular a substantially decreased damping and attenuation of the mechanical waves which are propagated in the waveguide.

A structure of that kind can be a one-piece, tubular support, in particular in the form of a hollow cylinder, which supports a waveguide extending for example in a coaxial direction in the interior of the hollow cylinder, and which protects the waveguide from external disturbances or interference. Such a support has the particular advantage that the waveguide can be easily introduced into the hollow cylinder in a single manufacturing step.

In accordance with a preferred feature of the invention the support may include a plurality of support elements which are disposed spaced apart from each other along the waveguide, such as annular webs or flanges. In the intermediate spaces between the support elements, the waveguide is enclosed by gas which provides an even lower degree of damping and attenuation in the waveguide than can be achieved with any solid material.

Narrowing the support elements, that is to say reducing the dimension of the support elements in the axial direction of the waveguide and the support, or increasing the size of the gas-filled regions between the support elements, affords a structure with an even higher proportion of gas and an even lower proportion of solid material, when considering the total length of the waveguide. The reduction in the dimension of the support elements is achieved in particular by reducing the area of the contact surfaces between the waveguide and each of the support elements constituting the support arrangement.

The most advantageous case in terms of a damping or attenuation effect is realized with a support including a plurality of flanges or webs of small width, which are spaced apart along the length of the waveguide, and which touch the waveguide at a smallest possible contact surface area, with the wave guide being disposed in particular centrally in the support arrangement.

The support which is preferably electrically insulating and preferably also elastic can be made from a particularly light material such as plastic material. This results in a reduction in the specific density of the support and thus has an advantageous effect on the susceptibility to trouble of the position sensor arrangement. The relatively low mass of the support arrangement develops only little kinetic energy in the event of external disturbances such as sound conducted through solids, shock, or vibration. The support only hits or knocks against the waveguide, thus causing an interference signal, when a mechanical influence acting thereon is at a substantially higher level than is the case with a conventional support.

A support which has a cell form or foam form structure, with a high proportion of gas and a low proportion of solid material, is particularly suitable for satisfactorily supporting a waveguide, due to the relatively low density of the support.

The support structure can be an open-pore (open-cell) or a closed-pore (closed-cell) structure. Suitable structures in this respect are for example structures which, by stretching, foaming, cross-linking etc., include a proportion of gas into the structure and thus have a low level of wave absorption. A support with a high proportion of gas and a low proportion of solid material, which for example includes the above-mentioned substances, is referred to hereinafter as being of a cell-form structure, a cell structure, or a cellular structure.

If moreover the structure is self-supporting, that is to say it is independent from any additional mechanical support, a further enclosure or sheath such as a casing or a tube which supports the support on the exterior is not required. The support structure can be directly used as a self-supporting structure, without requiring further measures.

The solid materials that can be used for the support are in particular plastic materials, for example fluorine-bearing polymers, but also any substances which are good electrical insulators with a low dielectric constant. Such materials include for example foamed polymers and elastomers, glass foam, glass balls, cross-linked, stretched or expanded materials or composites comprising such materials.

As already mentioned hereinbefore, the support may comprise a hollow cylinder which completely encloses the waveguide. On the other hand, the operation of fitting the support onto the waveguide is made easier if for example the support has a lateral slot which preferably extends as far as to the center of the support, as viewed with respect to the cross-section of the support. The waveguide can be fitted through this slot into the support. With this embodiment, the waveguide is only enclosed over a part of its periphery by the support.

In the embodiments referred to hereinbefore the waveguide is at least partially in contact with the support and mechanically braced thereby.

A further reduction in the area of contact between the waveguide and the support can be achieved if the waveguide is surrounded for example by a support extending in a helical configuration.

It has been found that in particular supports that are in the form of a strip and in the form of a wire and which can also be provided for example with feet or support knobs are suitable for providing an adequate mechanical support for the waveguide. In particular they prevent a lateral movement of the waveguide. Substances having a cell-form structure are also suitable as a material for the helical support arrangement.

It is also possible to provide, around the helical support arrangement, a further support, for example a support which has a cell-form structure and which is in the form of a hollow cylinder and which encloses the combination of the waveguide and the helical support arrangement, at least over a part of the periphery thereof.

Position sensors based on the principle of measuring the transit time of mechanical waves in a metal waveguide include, apart from the waveguide which itself can also be electrically conductive, an outer return conductor which is in the form of a tube, a wire or a strip and which closes the exciter circuit of the position sensor.

In the case of a tubular electrical return conductor which preferably embraces the waveguide coaxially, an electrically insulating support is disposed between the waveguide and the surrounding return conductor. The electrical return conductor may for example comprise a braided wire, a braided strip, a tube, or a foil or sheet.

In the case of a wire-shaped electrical return conductor, the return conductor can be embedded in the structure of the support.

The stability with respect to the shape of the support can furthermore be enhanced by form-stabilising means in particular by fibers which suitably reinforce the support. Suitable fiber materials are for example glass, carbon, KEVLAR and aramid fibers and the like.

A support which is reinforced in that way need not be additionally introduced into a further enclosure such as a tube, casing, sheath or the like which provides a mechanical supporting function, but can be laid or installed directly without involving further measures. Simple fixing means for securing it in position are for example clips or clasps, in particular comprising insulating material or non-magnetic material.

Besides performing its function as a mechanical support and providing electrical insulation, the support can also act at the same time as a damping element at the ends of the waveguide.

Similar to a reflection of optical waves at a transition from an optically dense medium into an optically less dense medium, mechanical waves are also reflected at the ends of the waveguide. Any reflections generated in that manner may be superimposed on the useful signal and thus result in incorrect and erroneous measurement results. This is particularly troublesome when dealing with short measurement sequences or upon periodic stimulation and excitation of the waveguide with rapid pulse sequences.

Various damping and attenuation methods can be employed. Frequently, a damping or attenuation element of silicone rubber is mounted or glued to the ends of the waveguide in order to damp the undesirable reflection phenomena. In that respect it is necessary for the damping or attenuation zones to be of the smallest possible spatial extent so that it is possible to provide reliable and accurate measurements even in the end region of the measuring arrangement. This is important for example in the case of a fill level indicator of a vessel in the proximity of the bottom of the vessel.

In order to damp and attenuate undesirable reflections of mechanical waves at the free ends of the waveguide, the support can be provided in that region with an increased damping or attenuation effect. An increased damping effect can be achieved in particular by using a soft material with a high level of density which firmly embraces and encloses the waveguide on all sides thereof.

For that purpose the support of a cell-form structure is preferably compacted in the region of the ends of the waveguide, in particular at the free end of the waveguide. For that purpose for example a pressing sleeve can be fitted onto the waveguide in per se known manner at the appropriate location and pressed onto the waveguide by the use of suitable tools.

Besides being reduced or compacted by mechanical means in the above-indicated manner, the support can for example also be durably compressed by thermal compacting or by a suitable combination of the two procedures. The electrical contacting of the electrically conductive waveguide with the electrical return conductor, which can be disposed in coaxial or biaxial relationship, can be implemented at the same time. Therefore, permanent closure of the electrical circuit and permanent compression of the support enclosing the waveguide is effected at the same time, thereby resulting in a damping element which is formed in one piece with the support in the end region of the waveguide.

A positive side-effect of compacting the support, which is effected by a thermal fusion procedure, is that at the same time the end of the waveguide, and in particular the electrical connection between the inner and outer conductors, is suitably protected from environmental influences and is hermetically sealed off by the fused, compacted plastic material.

Another embodiment of the support according to the invention provides for the application of a sealing cap which is fitted onto an end of the waveguide, the cap comprising a plastic material which sticks to the waveguide and/or is compacted thereon in a fused condition.

In order to further improve mechanical insulation with respect to mechanical or acoustic disturbance or interference factors, which act on the arrangement from the exterior, a further outer insulation may be provided around the coaxial tubular metal return conductor, with the outer insulation preferably also providing electrical insulation. A layer which can additionally be applied, comprising the same or a different material, finally serves to provide protection from wear and abrasion.

The outer sheathings, like the inner support, may also have a high gas/solid material ratio.

In all embodiments described hereinafter, the support which is of a cell-form structure and which at least partially embraces the periphery of the waveguide does not stick or adhere to the waveguide but permits a movement between the waveguide and the support in the axial direction. Such movement however is preferably reduced to a minimum.

A tubular return conductor which completely encloses the waveguide makes it possible at the same time to achieve a magnetic and electromagnetic shielding effect if the material adopted for the return conductor is a material which, besides magnetic permeability, has sufficient electrical conductivity, such as for example a foil shrouding or bandaging comprising a very thin foil, in particular a p-metal (mu-metal) foil.

The permeability and the thickness of the material of the shielding return conductor are to be so matched to each other that the field of the position-indicating displaceable magnet still has a sufficient effect or magnetic penetration to provide a magnetostrictive effect which results in the generation of a mechanical longitudinal or torsional wave.

Regarding the method of producing a support for a waveguide for conducting mechanical waves, a particularly advantageous procedure thereof provides that first a support of a configuration as referred to hereinbefore in accordance with the invention is produced on a core of inexpensive material, constituting what is referred to herein as an "auxiliary core", which subsequently in a further step in the operating procedure is replaced by the actual waveguide.

In principle, any suitable desired material which can be satisfactorily removed from the support and which does not stretch or tear excessively can be used to constitute the above-mentioned auxiliary core. An elastic material which experiences a reduction in diameter due to a stretching effect when the auxiliary core is in particular axially withdrawn from the support makes it significantly easier to withdraw the auxiliary core.

Before the auxiliary core is withdrawn from the support, one end of the auxiliary core is joined to the actual waveguide, in particular for example by means of a clamping or adhesive connection. The auxiliary core is then pulled out, whereby at the same time the waveguide is pulled into the support by virtue of being joined to the end of the auxiliary core.

The waveguide should be of a slightly smaller diameter than the auxiliary core to be pulled out, so that there is preferably a slight sliding fit between the waveguide and the support.

A particularly inexpensive procedure involves the use of a conventional coaxial cable, which is used for example for television antennae. The coaxial cable has an internal conductor, a coaxial tubular outer conductor and an insulating dielectric therebetween.

For the purposes of using the coaxial cable for a waveguide arrangement, the outer electrically and mechanically insulating sheathing which encloses the coaxial tubular return conductor is at least partially stripped off. The inner conductor is replaced by a waveguide, in particular by means of the above-described operating procedure using the inner conductor as an auxiliary core. In that situation the dielectric of the conventional coaxial cable serves as the support for the waveguide whereas the coaxial outer conductor or shield serves as the return conductor in the exciter circuit of a position sensor.

As described above, the coaxial cable, from which the external sheathing has been removed, can be mechanically reduced or concentrically compacted at the end of the waveguide. This provides a damping or attenuation element which damps undesirable reflections of mechanical waves at the free end of the waveguide.

Other features which are considered as characteristic for the invention are set forth in the appended claims.

Although the invention is illustrated and described herein as embodied in a support for waveguides for conducting mechanical waves and a method for producing such a support, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1A–1C and 2A–2C show a number of views of basic configurations of a waveguide arrangement with a support according to the invention, FIGS. 9A–9C show a number of views of an eighth embodiment of a waveguide arrangement with a support according to the invention and auxiliary conductors, FIGS. 13A and 13B show views illustrating the method of providing a pressing sleeve on the free end of the waveguide.

DESCRIPTION OF THE PREFERRED EMBODIMENTS

Figure 2A:
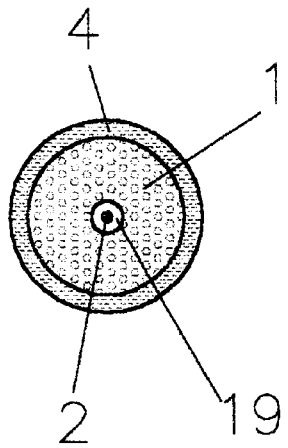
Figure 2B:
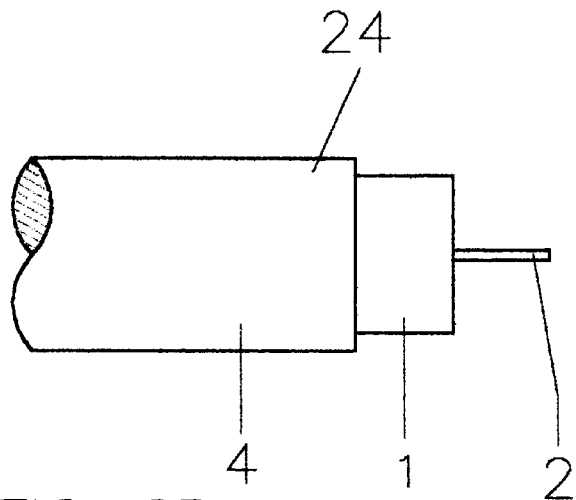
Figure 2C:
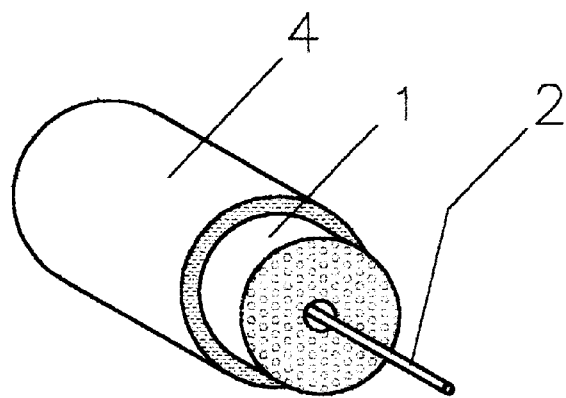

Referring now to the figures of the drawings in detail and first, particularly, to FIGS. 1A–1C and 2A–2C, there is shown a basic configuration of a waveguide arrangement for conducting mechanical waves, including a support 1 in the form of a hollow cylinder and a waveguide 2. The waveguide 2 can be any known waveguide type, in particular waveguides in the form of a tube, a wire, a strip, a band or a stranded wire assembly. In FIGS. 2A–2C the support 1 of the waveguide arrangement is additionally enclosed by a return conductor 4 which is arranged in a coaxial relationship with the support 1 and the waveguide 2.

In the embodiments illustrated in FIGS. 1A–1C and 2A–2C the waveguide 2 is guided in a cylindrical internal space indicated by reference numeral 19 in the support 1 and is thus mechanically supported without being excessively constricted or subjected to a compressive loading so that mechanical waves which are propagated on the waveguide 2 are only slightly damped and attenuated.

The support 1 which is in the form of a hollow cylinder is of a cell-form structure, that is to say it comprises a high proportion of gas and a low proportion of solid material such as foamed plastic material.

Any substances which are good electrical insulators such as polymers, elastomers, glass foam, cross-linked materials or composites of such materials are suitable for use as the support 1.

The structure of the support can be open-pore or closed-pore and it may additionally contain form-stabilising agents, for example fiber materials, which serve to reinforce the support and which also serve to reduce mechanical lengthwise extension under the effect of temperature.

Reference numeral 4 in FIGS. 2A–2C shows a coaxial return conductor having a smooth surface as indicated by reference numeral 24 which however can also be corrugated. Other suitable return conductors comprise a braided wire or strip or band or can be implemented by means of a sheet or foil which is applied to the support 1 in coaxial or biaxial relationship in strip form.

Figure 3A:
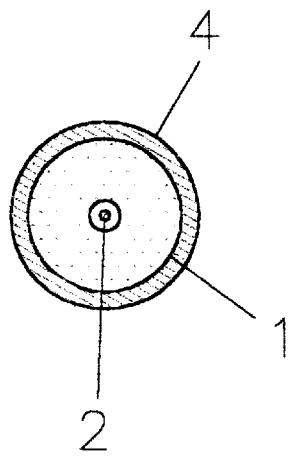
FIGS. 3A–3C show a number of views of a second embodiment of a waveguide arrangement with a support according to the invention.
Figure 3B:
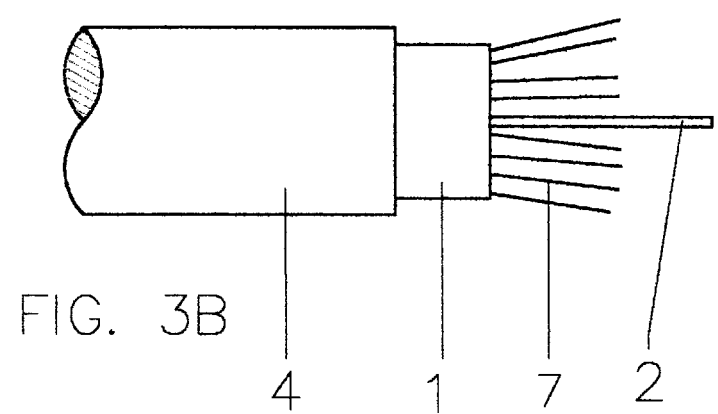
Figure 3C:
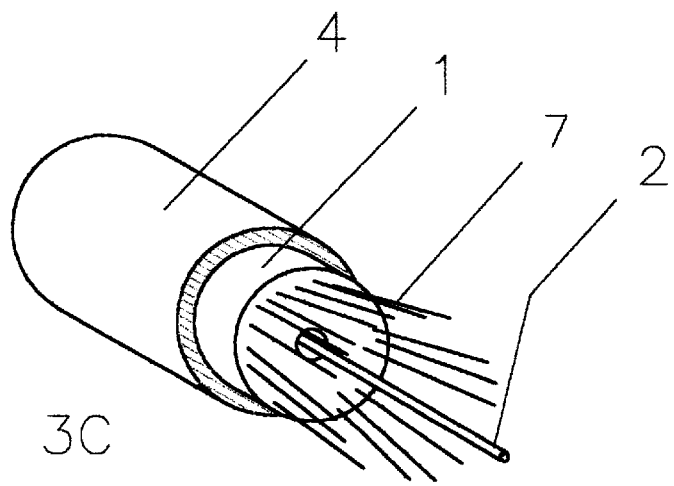

Referring now to FIGS. 3A–3C, shown therein is a coaxial waveguide arrangement similar to that shown in FIGS. 2A–2C, with a coaxial electrical return conductor generally indicated at 4, in which the support 1 is reinforced with a fibrous material 7 which in particular extends axially.

In the structure shown in FIGS. 3A–3C, the fibers 7 in the fibrous material are embedded in the cellular or cell-form insulating material of the support 1, but they may also be arranged at the surface of the support 1. In particular for example glass, carbon, KEVLAR, aramid or other fibers can be used as the reinforcing fibers 7.

Figure 4A:
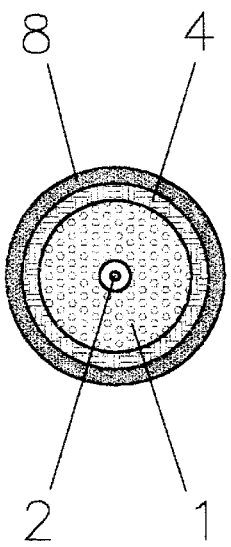
FIGS. 4A–4C show a number of views of a third embodiment of a waveguide arrangement with a support according to the invention.
Figure 4B:
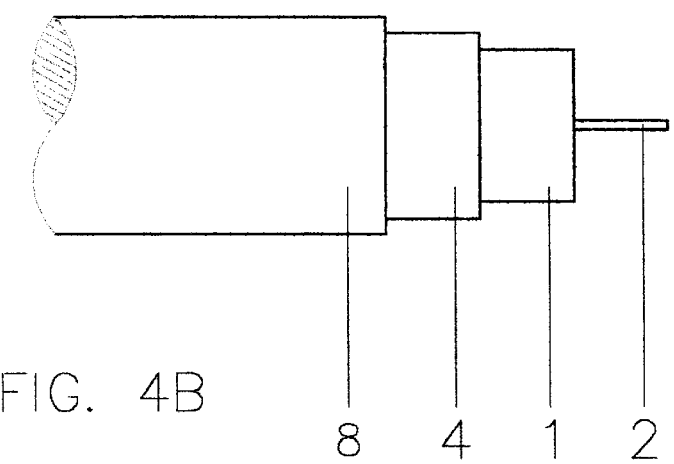
Figure 4C:
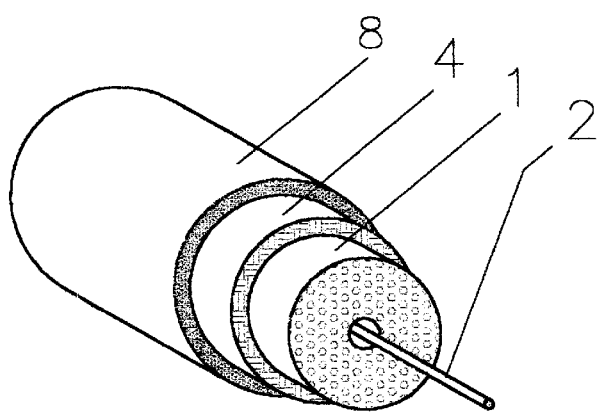

Referring now to FIGS. 4A–4C, shown therein is the waveguide arrangement of FIGS. 1A–1C and 2A–2C or FIGS. 3A–3C which however is additionally sheathed or enclosed with an insulating sheath 8 which can comprise the same material as the support 1, that is to say preferably a plastic material such as for example a polymer or an elastomer, but in denser form, for example without pores or with fewer pores.

The insulating sheath 8 which encloses the support 1 serves on the one hand as an electrical insulation between the waveguide 2 and the coaxial return conductor 4 and on the other hand as a mechanical insulation against mechanical or acoustic disturbances which act on the assembly from the exterior.

Figure 5A:
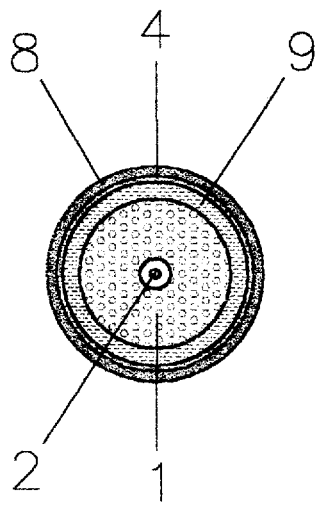
FIGS. 5A–5C show a number of views of a fourth embodiment of a waveguide arrangement with a support according to the invention.
Figure 5B:
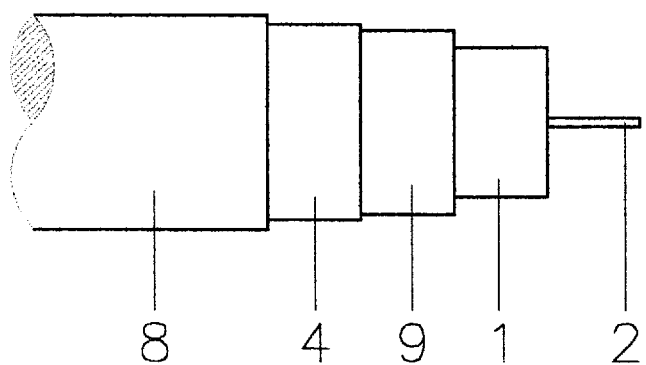
Figure 5C:
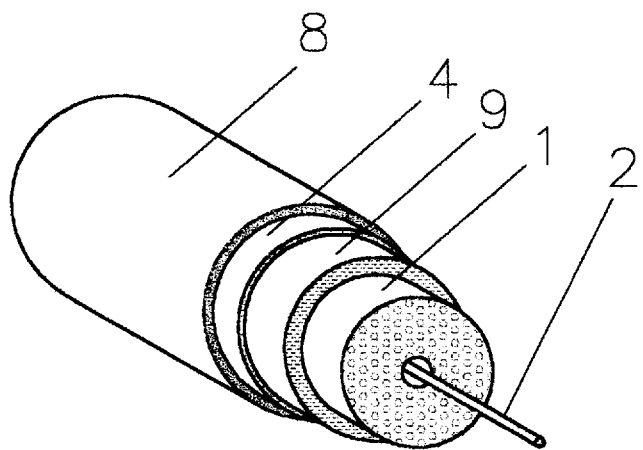

Reference will now be made to FIGS. 5A–5C illustrating a waveguide arrangement having a return conductor foil 9 which is arranged between the support 1 and the coaxial return conductor 4. The outer insulating sheath 8 is similar to the inner support 1 in terms of the nature of its material and has a gas/solid material ratio which is as high as possible. The outer insulating sheath 8 is also made from foamed, cellular, insulating material.

It is advantageous for the outer insulating sheath to comprise a closed-pore material or a material with a closed outer skin or surface layer, for example a PU-integral foam, in order to provide protection against wear and abrasion.

It is to be noted at this point that plastic materials which can be used both, for the support 1 and also for the insulating sheath 8 can be selected from the group of polymers, for example FEP (fluoroethylene copolymer), PTFE (polytetrafluoroethylene), PVC (polyvinylchloride), PA (polyamide), PE (polyethylene), PP (polypropylene) or SPE (foamed polyethylene) or from the group of elastomers, for example SR (silicone rubber), PU (polyurethane) and so forth.

Figure 6A:
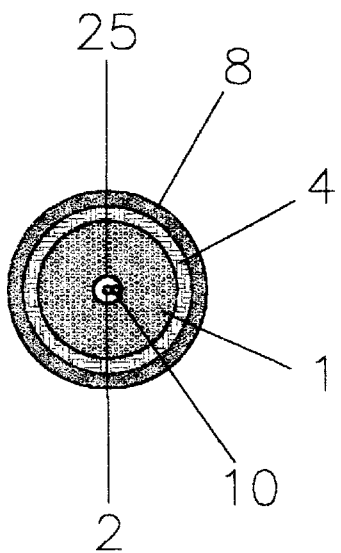
FIGS. 6A–6C show a number of views of a fifth embodiment of a waveguide arrangement with a support according to the invention.
Figure 6B:
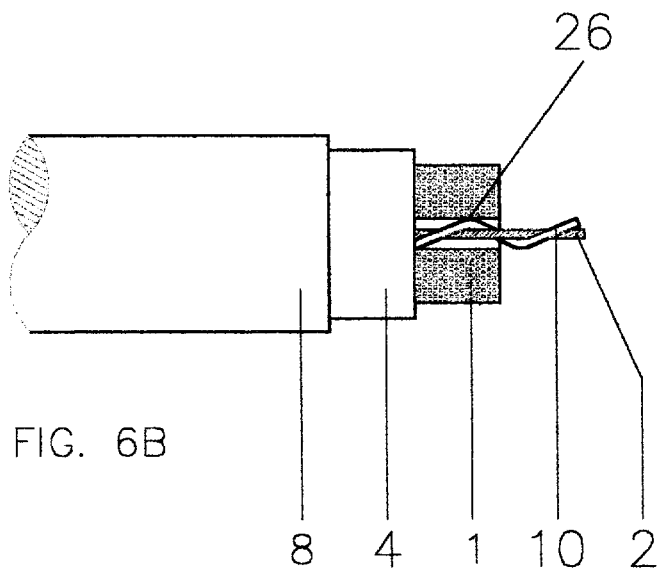
Figure 6C:
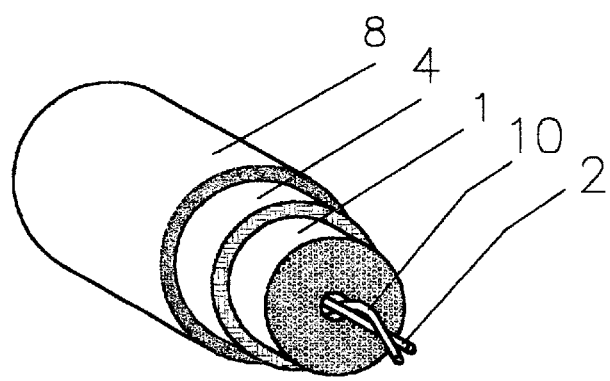

FIGS. 6A–6C show a waveguide arrangement having a coaxial return conductor 4, a support 1 in the form of a hollow cylinder for supporting a waveguide 2, and an insulating sheath 8. These components correspond to those to be found in the structure shown in FIGS. 5A–5C.

In the embodiment shown in FIGS. 6A–6C, a support 10 in wire form is wound in a helical configuration around the waveguide 2 and preferably also comprises material of a cell-form structure, which is adapted to support the waveguide 2 and to center it in the cylindrical internal space 19 defined within the support 1 at the center thereof.

By virtue of the wire support 10 being wound in a helical configuration around the waveguide 2, the contact surfaces between the wire support 10 and the waveguide 2 are minimal in area. The spiral winding of the support 10 around the waveguide 2 permits a further reduction in the contact surface area between the support 10 and the waveguide 2 and thus affords a lower damping effect on the waveguide 2.

It is noted that the wire support 10 touches the inner periphery of the support 1, the inner periphery being shown but not referenced in FIGS. 6A–6C, at further contact surfaces indicated by reference numeral 26. Those surfaces 26 can be increased in width in a foot-like configuration (not shown) at the support 10, for example to provide a better supporting effect.

Figure 7A:
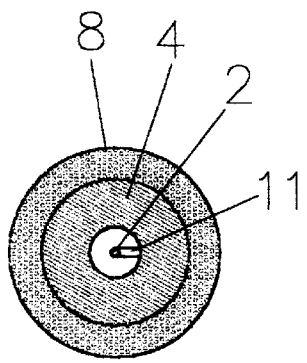
FIGS. 7A–7C show a number of views of a sixth embodiment of a waveguide arrangement with a support according to the invention.
Figure 7B:
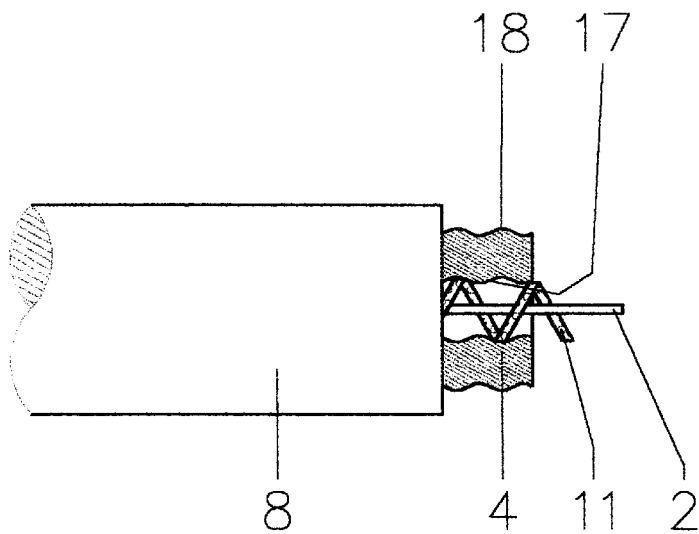
Figure 7C:
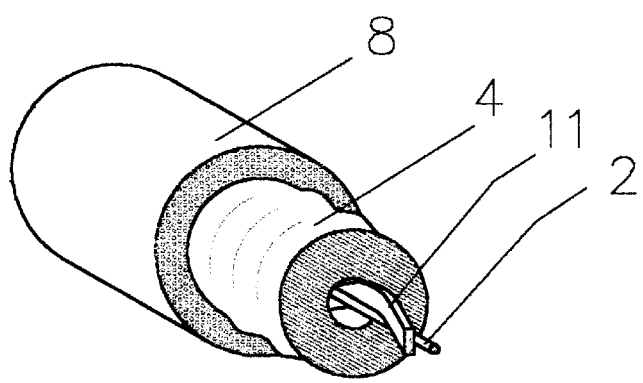

FIGS. 7A–7C show another embodiment of a support wound in a helical configuration. In this case also the waveguide 2 which is guided at the center of the arrangement is surrounded in a helical configuration by a support 11 in strip form and is carried thereby.

In this case however the strip support 11 is arranged centrally together with the waveguide 2 in the internal space 19 in the return conductor 4 which is of a tubular configuration. In this arrangement the strip support 11 bears against the inner periphery 17 of the electrical return conductor 4.

The coaxial return conductor 4 may have a smooth surface or, as shown here, it may have a corrugated surface at both its inner and outer peripheries as indicated by reference numerals 17 and 18 respectively. The corrugations can be formed by individual coaxial or annular constrictions or they can be produced by a single constriction or groove of a helical configuration. That configuration allows the tubular corrugated return conductor 4 to be more easily bent and flexed and laid in radii.

Figure 8A:
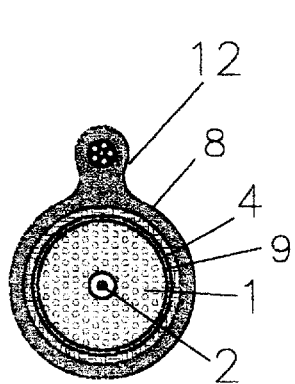
FIGS. 8A–8C show a number of views of a seventh embodiment of a waveguide arrangement with a support according to the invention and a supporting cable.
Figure 8B:
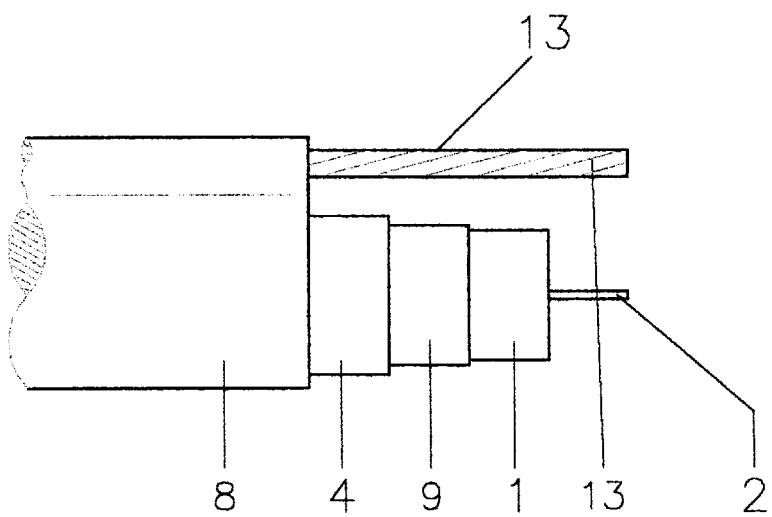
Figure 8C:
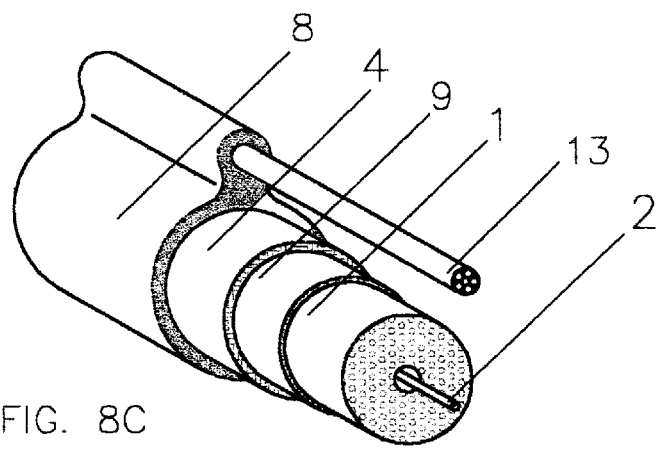

FIGS. 8A–8C illustrate a waveguide arrangement similar to the arrangement of FIGS. 5A–5C, comprising a waveguide 2, a support 1, a coaxial return conductor 9 in the form of a foil or sheet, and an electrical return conductor 4 which is surrounded by an insulating sheath 8.

Formed in one piece with the insulating sheath 8 is a projecting portion indicated by reference numeral 12 which accommodates a supporting cable 13 of steel. Other fixing means such as for example bars of various materials may also serve for the purposes of laying or installing the sensor arrangement, in place of the supporting cable.

The fixing means are preferably elongate elements which extend in the longitudinal direction of the waveguide 2, that is to say parallel to the waveguide 2, and which are preferably arranged in a portion of the insulating sheath 8.

FIGS. 9A–9C show a multi-layer waveguide arrangement comprising a support 1, a waveguide 2, a coaxial return conductor foil or sheet 9 and an insulating sheath 8, together with a filling material as indicated by reference numeral 15 in which auxiliary electrical conductors 14 are embedded.

As indicated above the coaxial waveguide arrangement comprises a waveguide 2, a support 1, a coaxial return conductor foil 9 coaxially surrounded by the filling material 15 and a coaxial insulating sheath 8. It will be appreciated that these components of the arrangement are listed from the interior thereof outwardly.

As indicated above, one or more auxiliary electrical conductors 14 can be embedded in the filling material 15 and preferably extend parallel to the waveguide 2. Electrical fields generated by current pulses in the auxiliary conductors 14 are shielded from the waveguide 2 in the usual manner by the coaxial assembly comprising the support 1 and the electrical return conductor foil or sheet 9.

Referring now to FIGS. 10A–10C and 11A–11C, the embodiments illustrated therein of a waveguide arrangement with a coaxial electrical return conductor 4 provide that the coaxial support 1 as between the waveguide 2 and the electrical coaxial return conductor 4 is provided by annular webs or flanges 3. The flanges 3 are preferably disposed at the largest possible spacings from each other and preferably have the smallest possible width, that is to say the smallest possible dimension in the axial direction of the waveguide arrangement, so as to provide the smallest possible contact surface with the waveguide 2.

The annular webs or flanges 3 project, over the internal periphery 17 of the support 1, at least partially into the interior 19 of the support 1. At least the inner end regions of the respective webs or flanges 3 are wedge-shaped, converging in a point, and are of such a configuration that the waveguide 2 is mechanically properly held in position, with only a small contact surface area between the waveguide 2 and the insulating material of the webs or flanges 3 in order to provide the lowest possible level of damping or attenuation of the mechanical waves to be conducted through the waveguide. On the other hand, mechanical disturbances, which act on the arrangement from the exterior, in the form of vibration, shock or impact pulses are counteracted with a damping effect. In this arrangement the waveguide 2 does not bear against the inner periphery 17 of the support 1.

The spacings between the webs or flanges 3 are so selected that any sag of the waveguide 2 between adjacent webs or flanges 3 does not have a disturbing effect on the degree of measurement accuracy.

Figure 10A:
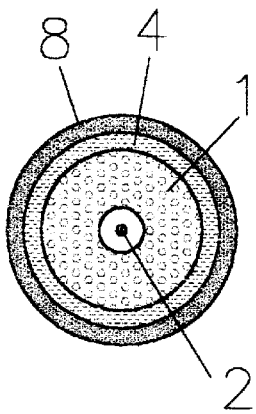
FIGS. 10A–10C and 11A–11C show a number of views of a ninth embodiment of a waveguide arrangement with a support according to the invention with supporting webs or flanges.
Figure 10B:
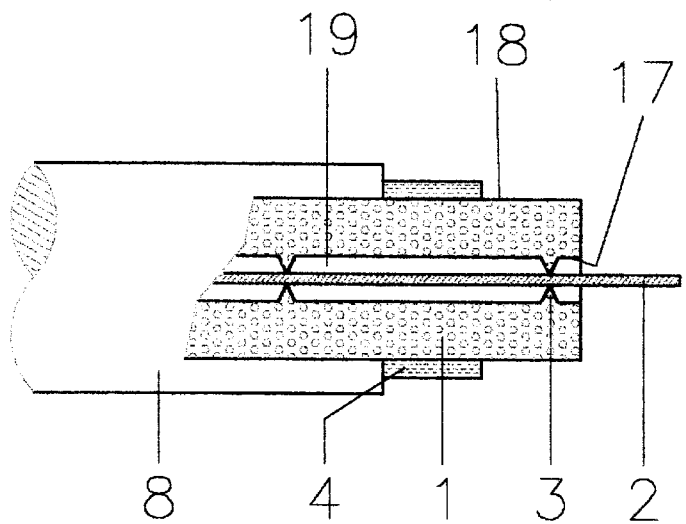
Figure 10C:
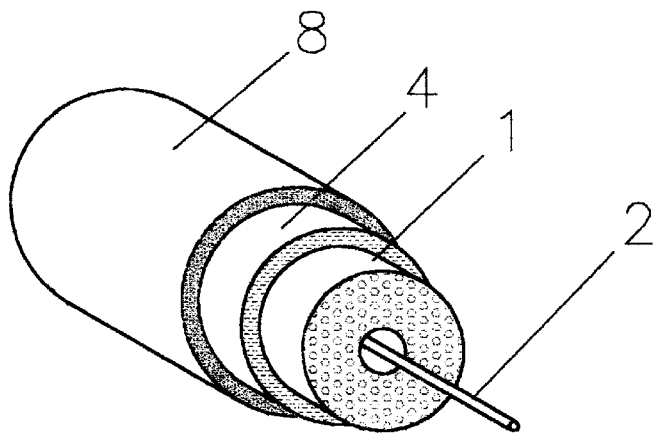

In FIGS. 10A–10C the webs or flanges 3 comprise the same material of cell-form structure as the support 1 and are formed in particular in one piece with the support 1 which can be an open-pore or closed-pore material.

Figure 11A:
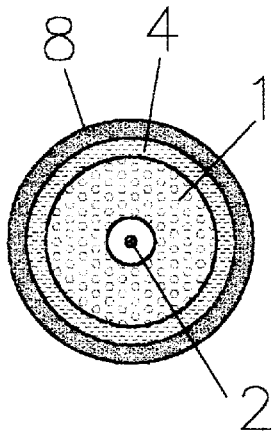
Figure 11B:
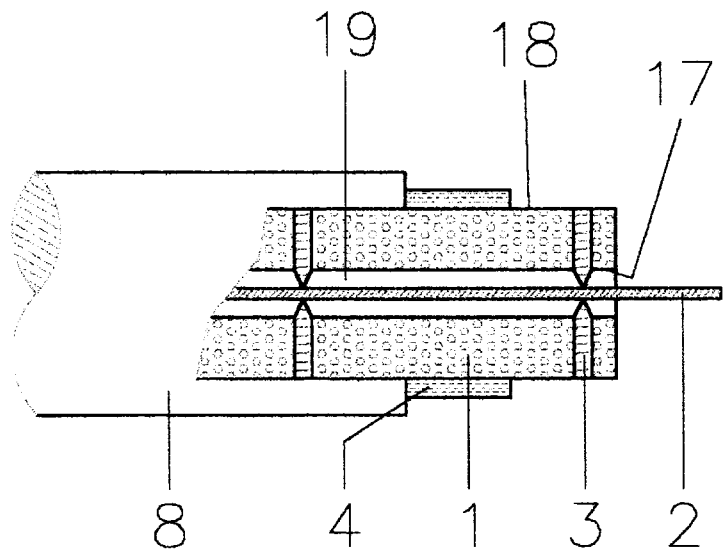
Figure 11C:
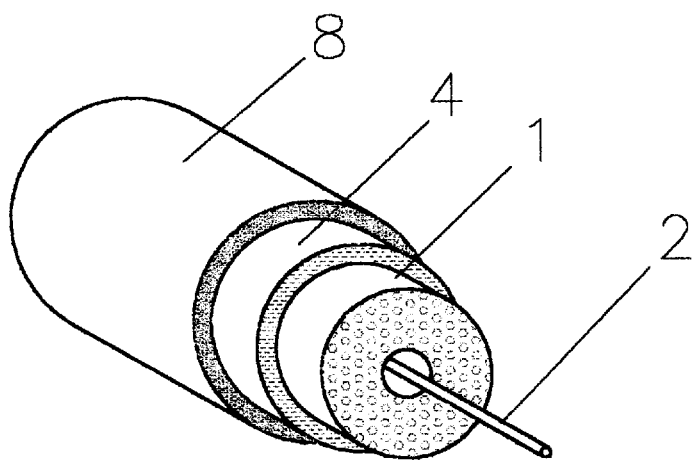

The material of the webs or flanges 3 in FIGS. 11A–11C comprises another, in particular non-cellular, insulating material such as for example PTFE, PE, silicone, PU, PA, polyimide and the like material.

In the structure shown in FIGS. 10A–10C, the webs or flanges 3 are formed in one piece with the support 1, but they may alternatively also be arranged as separate elements in the support 1 as shown in FIGS. 11A–11C.

The webs or flanges 3 are preferably arranged at a right angle to the direction in which the waveguide 2 extends, with the outer peripheral surface of each of the webs or flanges 3 terminating flush with the outside peripheral surface 18 of the support 1 in FIGS. 11A–11C. The cross-section of the annular flanges or webs 3 may also be larger or smaller than the cross-section of the support 1.

Figure 12A:
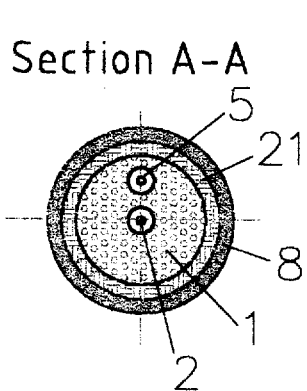
FIGS. 12A–12C show a number of views of a tenth embodiment of a waveguide arrangement with an embedded return conductor.
Figure 12B:
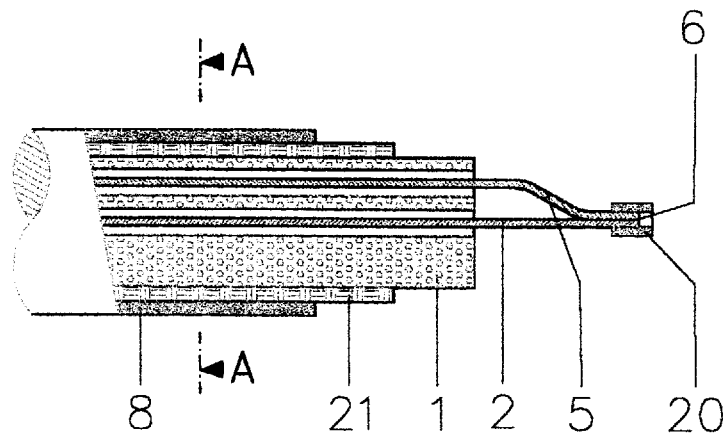
Figure 12C:
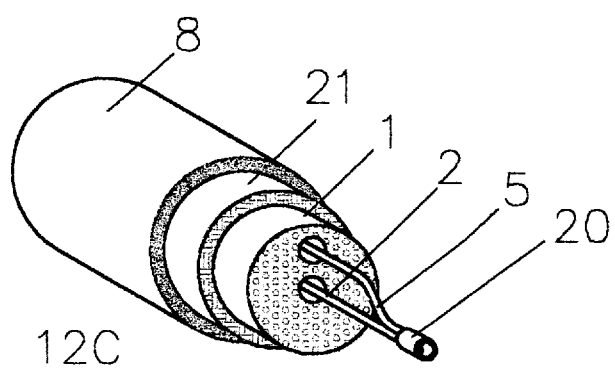

FIGS. 12A–12C show a further embodiment of a waveguide arrangement with an electrical return conductor 5 in the form of a wire, wherein provided at the end thereof is a sleeve as indicated by reference numeral 20 which is preferably magnetically and electrically conductive and which electrically conductively connects the waveguide 2 to the wire-shaped electrical return conductor 5. The electrical return conductor 5 is embedded in an outer region of the coaxial support 1 which is in the form of a hollow cylinder.

The waveguide 2 is shielded from electromagnetic fields by a coaxial shield 21 which is also insulated electrically and mechanically from disturbances and interference acting on the assembly from the exterior, by a coaxial insulating sheath as indicated diagrammatically by reference numeral 8.

Besides the connection by means of a clamping sleeve 20, it would also be possible for the electrical connection between the electrical return conductor 5 and the end 6 of the waveguide 2 to be made by soldering, brazing, welding, pressing or other appropriate joining procedures.

FIGS. 13A and 13B show a view of a waveguide arrangement including a coaxial electrical return conductor 4, for illustrating and describing the procedure for producing a damping or attenuation region with simultaneous contacting of the mechanical waveguide 2 with the coaxial electrical return conductor 4.

Referring therefore firstly to FIG. 13A, the waveguide arrangement illustrated therein includes a waveguide 2 which is guided centrally in a support 1 of a hollow-cylindrical configuration, and projects axially beyond an end face 23 of the support 1.

The coaxial electrical return conductor 4 surrounding the support 1 and a pressing sleeve 22 which is fitted onto the return conductor 4 in the end region project approximately by the same distance as the waveguide axially beyond the end face 23 of the support 1.

In order to provide the necessary compacting of the insulating material of the support 1, the pressing sleeve 22 is pressed jointly with the insulating material of the support 1 onto the waveguide 2 in known manner by means of suitable tools in conically concentric configuration, whereby contact occurs at the same time between the mechanical waveguide 2 and the electrical return conductor 4 which is arranged in coaxial or biaxial relationship.

Accordingly a durable and permanent closure of the electrical circuit involved and durable and permanent compression of the support 1 embracing the waveguide 2, in the axial region of the support 1, are effected at the same time.

It will be appreciated that compacting of the material of the support results in an increased damping or attenuation effect and contributes at least to suppressing undesirable reflection phenomena in respect of mechanical waves in the region of the free end of the wave guide 2.

It will be appreciated that the above-described embodiments of the support and process according to the present invention have been set forth solely by way of example and illustration of the principles thereof and that various other modifications and alterations may be made therein without thereby departing from the spirit and scope of the invention.

I claim:

1. In combination with a waveguide for conducting mechanical wave, a support for the waveguide, comprising:
    a support body having a cell-form structure;
    said support body at least partially sheathing the waveguide and mechanically supporting the waveguide; and
    said cell-form structure having a high proportion of gas and a low proportion of solid material for minimizing an attenuation of the mechanical waves conducted on the waveguide.

2. The support according to claim 1, wherein said support body has a plurality of web portions disposed at spacings along the waveguide for supporting the waveguide.

3. The support according to claim 2, wherein said web portions have a given contact area with the waveguide and are disposed at given mutual spacings for supporting the waveguide.

4. The support according to claim 1, wherein said support body has a given density.

5. A waveguide configuration, comprising:
    an elongate waveguide for conducting mechanical waves;
    a support body having a cell-form structure;
    said support body mechanically supporting said elongate waveguide by at least partially encircling said elongate waveguide over at least a part of a length thereof;
    said support body having a cell-form structure with a proportion of gas and a proportion of solid material, the proportion of gas being greater than the proportion of solid material for minimizing an attenuation of the mechanical waves conducted on the waveguide.

6. The support according to claim 1, wherein said support body is self-supporting.

7. The support according to claim 1, wherein said support body is made from a plastic material.

8. The support according to claim 1, wherein said support body has an open-pore cell-form structure.

9. The support according to claim 1, wherein said support body has a closed-pore cell-form structure.

10. The support according to claim 1, wherein said support body encloses the waveguide at least over a part of a periphery of the waveguide.

11. The support according to claim 1, including an electrical return conductor for a position sensor operating on the basis of the principle of transit time of the mechanical waves, said electrical return conductor disposed coaxially around the waveguide and said support body disposed between the waveguide and said electrical return conductor.

12. The support according to claim 11, wherein said support body is disposed between the waveguide and said return conductor along the entire length of the waveguide.

13. The support according to claim 1, including a wire-shaped electrical return conductor of a position sensor, said wire-shaped return conductor embedded into said support body.

14. The support according to claim 1, including a form-stabilizer for reinforcing said support body.

15. The support according to claim 14, wherein said form-stabilizer for reinforcing said support body includes fibers.

16. The support according to claim 1, wherein said support body has an end region at a free end of the waveguide and has a central region, said end region having a higher damping effect on the mechanical waves propagated along the waveguide than said central region for damping an undesired reflection of the mechanical waves at the free end of the waveguide.

17. The support according to claim 5, wherein said support body has an end region at a free end of a waveguide and has a central region, said end region having a denser cell-form structure than said central region for damping an undesired reflection of the mechanical waves at the free end of the waveguide.

18. The support according to claim 1, including a protection device for protecting a free end of the waveguide from environmental influences.

19. The support according to claim 1, including an electrical return conductor of a position sensor operating on the basis of the principle of a transit time of the mechanical waves, said return conductor disposed coaxially around the waveguide, said support body disposed between the waveguide and said electrical return conductor, said electrical return conductor and the waveguide connected at respective end regions thereof and protected form environmental influences.

20. The support according to claim 1, wherein said support body has a plurality of web portions spaced along the waveguide for supporting the waveguide within said support body, said plurality of web portions formed of a non-cell-form structure.

21. The support according to claim 1, wherein said support body has a proportion of at least 50% by volume of gas and at most 50% by volume of solid material.

22. A method for producing a waveguide configuration having a waveguide surrounded by a support body, which comprises:

providing an auxiliary core;

producing a support body on the auxiliary core;

connecting the auxiliary core to a waveguide; and drawing the waveguide into the support body by withdrawing the auxiliary core from the support body in an axial direction thereof.

23. A method for supporting a waveguide, which comprises:

providing a coaxial cable having a conductor, a dielectric, a shielding, and a sheath;

replacing the conductor with a waveguide by withdrawing the conductor from the coaxial cable and drawing the waveguide into the coaxial cable in an axial direction thereof.

* * * * *